United States Patent
Cowan et al.

(10) Patent No.: US 6,357,672 B1
(45) Date of Patent: Mar. 19, 2002

(54) SEALING MEANS FOR A MULTI-AXIS NOZZLE

(75) Inventors: Curtis C. Cowan; George F. Leblanc, both of Palm Beach Gardens, FL (US)

(73) Assignee: United Technologies Corporation, Hartford, CT (US)

( * ) Notice: Subject to any disclaimer, the term of this patent is extended or adjusted under 35 U.S.C. 154(b) by 1088 days.

(21) Appl. No.: 08/499,100

(22) Filed: Jul. 6, 1995

(51) Int. Cl.$^7$ ............................................. B64C 15/00
(52) U.S. Cl. ..................... 239/265.19; 244/52
(58) Field of Search ................. 239/265.19, 265.35, 239/265.33, 265.37, 265.39, 265.27; 244/52, 110 B, 23 D, 12.5; 277/53, 55, 56, 57, 157, 160

(56) References Cited

U.S. PATENT DOCUMENTS

| | | | |
|---|---|---|---|
| 4,783,271 A | * | 11/1988 | Silverwater |
| 4,836,451 A | * | 6/1989 | Herrick et al. |
| 5,201,530 A | * | 4/1993 | Kelch et al. |
| 5,433,771 A | * | 7/1995 | Bachovchin et al. |
| 5,474,305 A | * | 12/1995 | Flower |
| 5,480,162 A | * | 1/1996 | Beeman |

\* cited by examiner

*Primary Examiner*—Charles T. Jordan
*Assistant Examiner*—Tim Dinh
(74) *Attorney, Agent, or Firm*—Norman Friedland

(57) ABSTRACT

Brush seals formed in hemispherical rings are supported to the end of the convergent nozzle of the each of the clam shells of a multi-axis vector thrust nozzle of a gas turbine engine powering aircraft. The brush seal may be arced or straight and bear against the spherical surface of the collar formed on the end of the tail pipe and is mounted so that high pressure forces the bristles against the backing plate of the seals.

6 Claims, 3 Drawing Sheets

SEALING MEANS FOR A MULTI-AXIS NOZZLE

TECHNICAL FIELD

This invention relates to seals and more particularly to seals for an exhaust nozzle with vectoring capabilities that is movable about multiple axes for a gas turbine engine.

BACKGROUND ART

This invention constitutes an improvement over the multi-axis thrust vectoring nozzle described and claimed in U.S. Pat. No. 4,836,451 granted to Herrick et al on Jun. 6, 1989 entitled "Yaw and Pitch Convergent-Divergent Thrust Vectoring Nozzle" assigned to United Technologies Corporation, the assignee common to this patent application which discloses a yaw and pitch convergent-divergent exhaust nozzle for a gas turbine engine. As disclosed in this patent a pair of cooperating clam shells hinged to a gimbal ring and pivotal about an axis perpendicular to the clam shell hinge axis surrounds the engine's tail pipe. The clam shells define a variable area nozzle throat which can be selectively directed vertically by rotation of the clam shells about its hinged axis or horizontally by rotation of the clam shells and gimbal ring about the gimbal axis for effectively varying the area of the exhaust nozzle to change or divert the exhaust flow and biasing the exhaust flow for vectoring the aircraft.

As is known in the aircraft engine technology, the prevention of hot mainstream gas or coolant leakage between mating components in multi-function exhaust systems is extremely important. It is of paramount importance that the hot gasses in the exhaust of the engine do not migrate into regions of low allowable temperature substructure and of like importance the compressor air utilized for cooling should not be diverted and prevented from reaching the destination to accomplish the necessary cooling. By preventing the hot gas ingestion, additional low weight, low allowable temperature structures can be utilized with a consequential improvement to the thrust-to-weight ratio. By preventing cooling system leakage, the nozzle performance is enhanced. Therefore, improving sealing technology enhances both aerodynamic and structural efficiency.

As noted in the U.S. Pat. No. 4,836,451 patent supra, arcuate seals disposed between the clamshell spherical surfaces and the collar spherical surface for preventing the flow of exhaust gas therebetween. The type of seals disclosed in this patent are seals, such as piston rings or spring seals.

As one skilled in the seal technology appreciates, seals are generally applied to parts which have relative motion only along a single axis, i.e. rotation or translation. Also, sealing between rotating, pivoting or translating members has been accomplished by techniques that include, for example, labyrinth, finger, piston rings and sheet metal seals. These types of seals have proven to be unsatisfactory for use in an application where the moving components move along multi-axes relative to each other.

We can obviate the problems enumerated in the above by providing a brush seal formed in hemis-spherical portions of a ring that is judiciously located in the convergent flap of a multi-axis vector nozzle. The brush seal comprises an arced or straight brush pieces of a plurality of high compliance high temper wire bristles. It has been found on an experimental rig tests that the seal made in accordance with this invention reduced leakage on the spherical section of the spherical convergent flap nozzle by as much as 44% and 72% when compared to conventional sheet metal and piston ring seals.

SUMMARY OF THE INVENTION

An object of this invention is to provide improved sealing means for a multi-axis vector exhaust nozzle for a gas turbine engine of the type that powers aircraft.

A feature of this invention is a brush seal formed in a ring that is judiciously located in the convergent flap of the multi-axis nozzle.

A still further feature of this invention is the utilization of high compliant, high temper, small diameter wire bristles formed in either an arc or straight configuration.

The foregoing and other features of the present invention will become more apparent from the following description and accompanying drawings.

DETAILED DESCRIPTION OF THE PREFERRED EMBODIMENT

Figure 1:
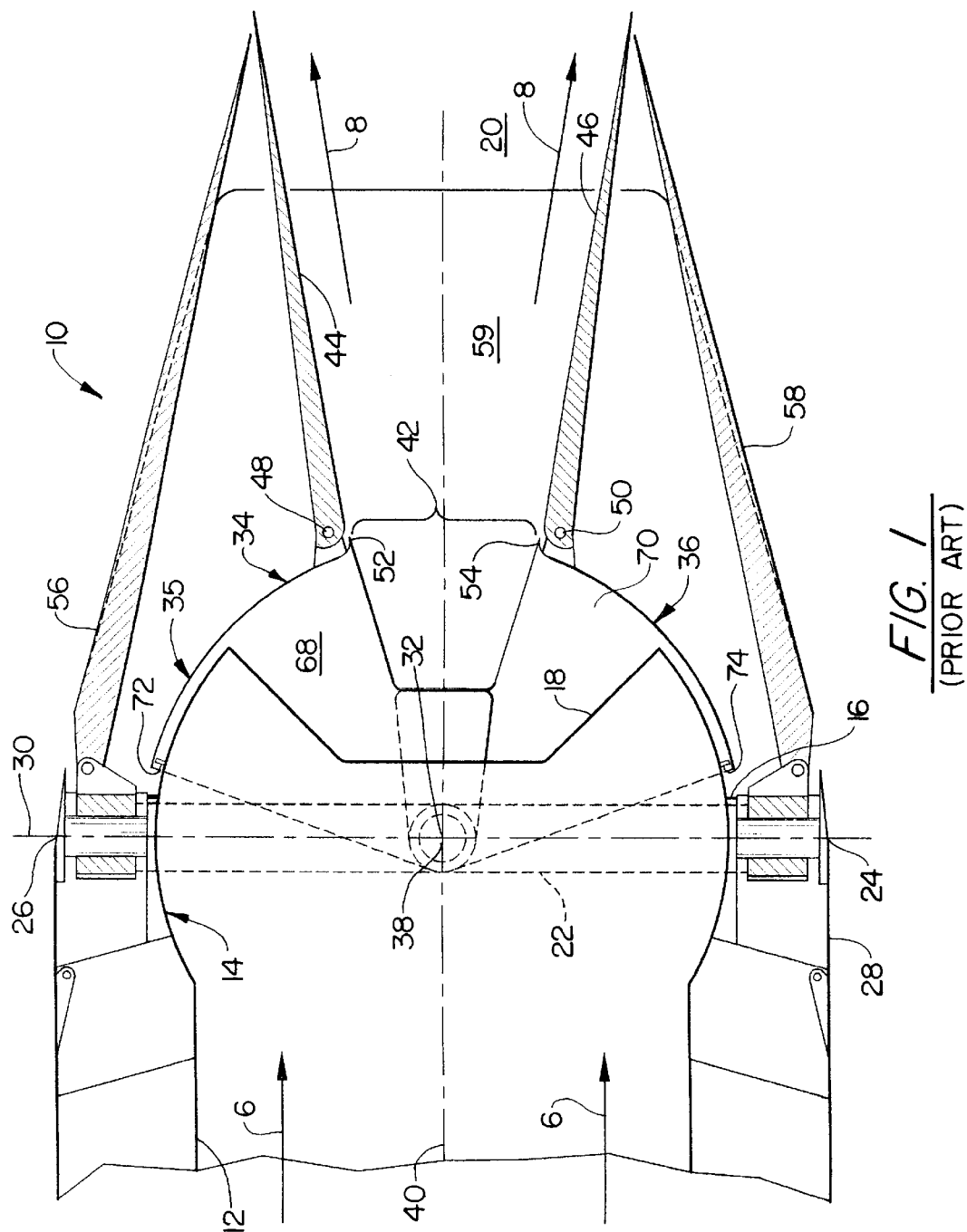
FIG. 1 is a schematic in cross section illustrating the prior art multi-axis vector nozzle.
Figure 2:
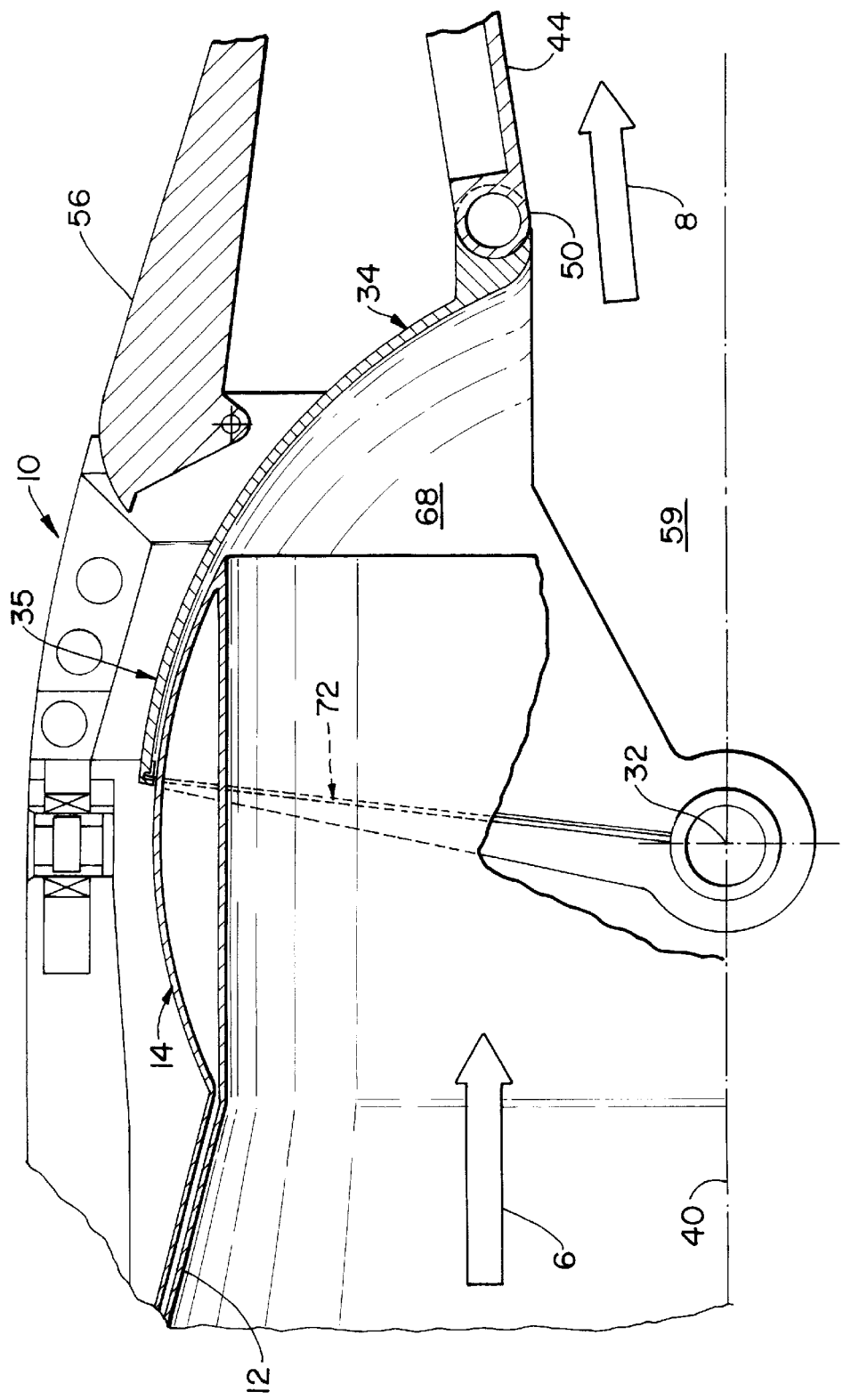
FIG. 2 is a view in section taken through the vertical plane illustrating this invention.

The prior art nozzle depicted in FIG. 1 shows a schematic cross section taken in the vertical plane of a nozzle 10 where the nozzle receives pressurized exhaust gas 6 from a gas turbine engine (not shown) through a conduit 12. The conduit 12 terminates in a collar portion 14 having a generally spherical external surface 16. The collar 14 includes a rearwardly facing opening 18 for discharging the exhaust gas into the nozzle outlet 20. The nozzle 10 further includes a gimbal ring 22 disposed about the collar 14 and including two opposed gimbal pivots 24, 26 for supporting the gimbal ring 22 relative to the nozzle static structure 28.

The gimbal pivots 24, 26 lie along a gimbal axis 30 shown in the vertical plane of FIG. 1 and which passes through a center point 32 defined by the collar spherical surface. 16. The gimbal ring 22 supports upper and lower clamshells 34, 36 which are independently pivotable about a common axis 38 oriented both perpendicular to the gimbal axis 30 and transverse to the nozzle center line 40. The common axis 38 passes through the collar spherical surface center point 32 and is shown coincident therewith in the vertical cross section of the FIG. 1.

Clamshells 34, 36 are independently pivotable to achieve a varying nozzle throat dimension 42 in order to provide the optimum nozzle outlet area for efficient thrust production. Thrust vectoring in the vertical plane may be achieved by orienting the clamshells 34, 36 asymmetrically with respect to the nozzle center line 40 so as to bias the flow of discharged gas 8 relative thereto.

The embodiment of FIG. 1 also includes upper and lower divergent flaps 44, 46 for providing a properly divergent gas flow path downstream of the nozzle throat 42. The divergent flaps 44, 46 are pivotably secured by linear hinges 48, 50 of the respective upper and lower clamshells 34, 36. The divergent flaps 44, 46 in cooperation with a pair of spaced apart fixed side walls 59 (only one being shown) define a divergent gas flow path aftward of the nozzle throat 42 for ensuring efficient expansion of the exhaust gas 8, especially for supersonic flow nozzles 10.

The divergent flaps 44, 46 are independently movable relative to the associated clamshell components 34, 36 and may thus be positioned to vary the divergent angle as well as the pitch thrust angle of the discharged gases 8. Outer fairing flaps 56, 58 provide a smooth exterior surface for airflow about the aircraft, and are hinged adjacent the upper and lower gimbal pivots 26, 24 as shown.

As noted the upper and lower clamshells 34, 36 have generally spherical interior surfaces 68, 70 that maintain a uniform spacing with regard to the spherical surface 16 of the collar 14. The nozzle 10 provides seals 72, 74 which will be described in greater detail hereinbelow disposed between the clamshell spherical surfaces 68, 70 and the collar spherical surface 16 for preventing the flow of exhaust gas 6 therebetween or the loss of coolant for cooling the components of nozzle 10. While the clamshells 34, 36 slide relative to the collar spherical surface along the vertical and horizontal axes, they attempt to maintain a uniform spacing over the entire range of motion but because of the hostile environment in which these components operate, it is difficult to keep this uniform spacing.

Figure 3:
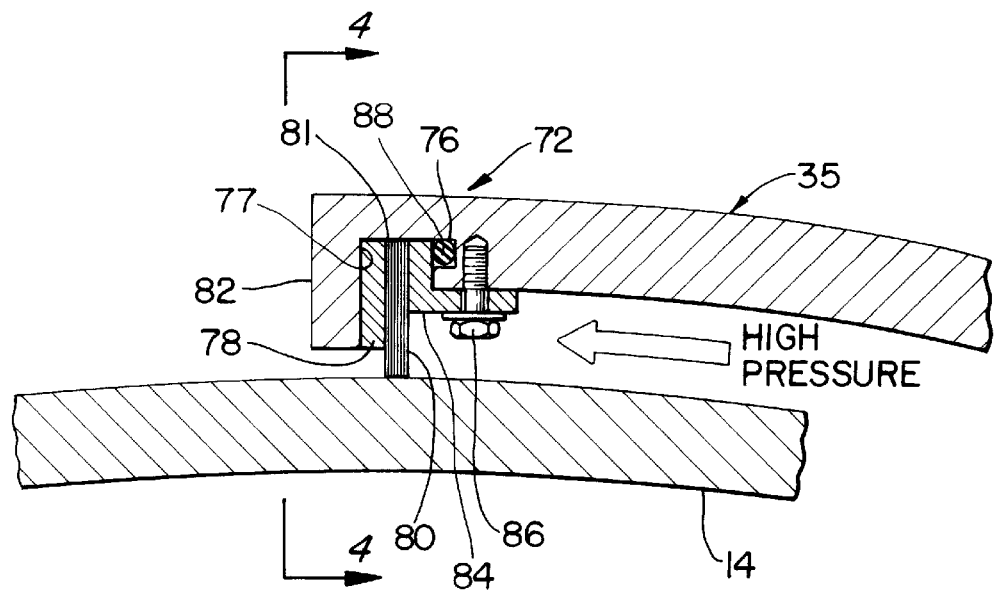
FIG. 3 is a partial view in section illustrating the details of this invention.
Figure 4:
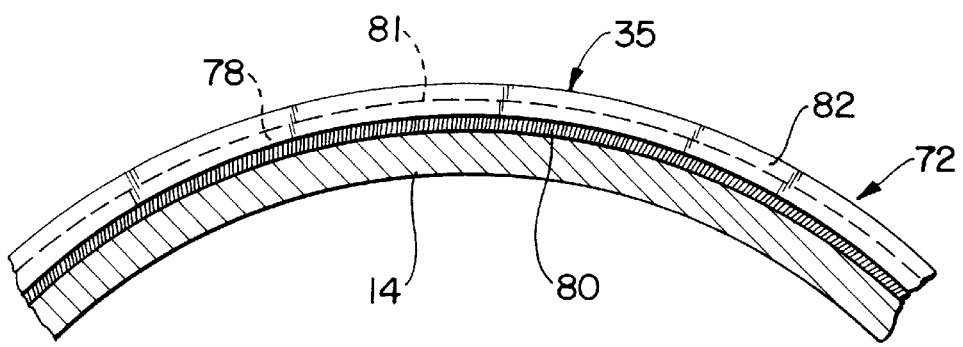
FIG. 4 is a partial view in section taken along lines 4—4 of FIG. 1.

In accordance with this invention and as best seen in FIGS. 3 and 4, the seals 72 and 74 are fabricated in hemispherical rings that include a semi circular front ring 76 and a complementary shaped backing plate 78. A plurality of small diameter high temper wire bristles 80, say 0.003 inch diameter, Haynes 25, are sandwiched between the front ring 76 and backing plate 78 and the rear end extends substantially to the outer diameter thereof. The bristles at point 81 are bonded in a suitable manner, say by brazing, to the front ring 76 and backing plate 78 to form an integral seal member 72 and 74. Each of the seal members 72 and 74 are clamped in the annular recess 77 formed between the end of the convergent flap 35, adjacent to the downward extending flange portion 82 axially spaced from the end of clamp member 84. The ends of front ring 76 and backing plate 78 remote from the working ends of the bristles extend to the back wall of recess 77. Clamp member 84 may be attached to the outer surface of the convergent flap 35 by the machine bolt 86 that threadably engages internal threads formed in the convergent flap. This allows the easy removal of the seal for maintenance purposes. An O-seal 88 may be inserted in the end of the convergent flap 35 to further reduce leakage.

As noted from FIG. 3 the seal is oriented relative to the gas stream in the nozzle such that the high pressure faces the bristles and forces the bristles against the backing plate. This assures that the bristles will be in sliding relation and hence in sealing relation with the spherical surface of the collar for every condition over the entire operating envelope of the nozzle 10.

Although this invention has been shown and described with respect to detailed embodiments thereof, it will be appreciated and understood by those skilled in the art that various changes in form and detail thereof may be made without departing from the spirit and scope of the claimed invention.

It is claimed:

1. Seal means for the clam shells of a vectoring thrust nozzle of a gas turbine engine comprising a fixed collar having a spherical outer surface, a gimbal ring surrounding said collar, a pair of articulating clam shells each having spherical surfaces for defining a sliding surface and being pivotally supported to said gimbal ring for vertical and horizontal movement, a pair of seals for each of said clam shells, each of said pair of seals comprising a semi-circular front ring complementing the configuration of each of said clam shells and a backing plate axially spaced from said semi-circular front ring and configured to complement the shape thereof disposed in a recess formed in each of said clamshells, said recess having a back wall, radially extending bristles sandwiched between said semi-circular front ring and said backing plate projecting beyond said front ring and said backing plate and having edges bearing against said spherical surface for defining a compliant rigid bristle, said edges being arced to define a partially spherical shape and configured to complement said sliding surface of each of said spherical surfaces, the end of said front ring and said backing plate located remote from said edges bearing against said back wall of said recess for forming a rigid body and means to clamp each of said seals to each of said clam shells for movement therewith so that said bristles are pressure loaded against said backing plate and remain in sealing position in rotational and translational modes.

2. Seal means for the clam shells of a vectoring thrust nozzle of a gas turbine engine as claimed in claim 1 wherein the edges of said bristles opposite the edges bearing against said spherical surface being bonded to said semi-circular front ring and said backing plate to form an integral unit.

3. Seal means for the clam shells of a vectoring thrust nozzle of a gas turbine engine as claimed in claim 2 wherein said bristles are made from wire that is tempered to Haynes 25 and the diameter of each of said bristles are substantially equal to 0.003 inches.

4. Seal means for the clam shells of a vectoring thrust nozzle of a gas turbine engine as claimed in claim 3 wherein said each of said clam shells includes a convergent flap, said means to clamp includes a clamping member affixed to the surface of said convergent flap having a flange extending radially toward said clam shell and spaced from the edge of said convergent flap to define a recess for supporting said seal means.

5. Seal means for the clam shells of a vectoring thrust nozzle of a gas turbine engine as claimed in claim 4 including a removable bolt attaching said clamp to said convergent flap.

6. Seal means as claimed in claim 5 including an O-ring seal supported in semi-circular recess formed on the end of said convergent flap and bearing against said semi-circular front ring.

* * * * *